United States Patent [19]

Sleeper

[11] 3,960,237
[45] June 1, 1976

[54] SOUND REDUCING ENCLOSING
[75] Inventor: David P. Sleeper, Waltham, Mass.
[73] Assignee: Ecology Controls, Inc., Waltham, Mass.
[22] Filed: Mar. 10, 1975
[21] Appl. No.: 556,813

[52] U.S. Cl. ............................................. 181/33 K
[51] Int. Cl.[2] ........................ F02F 7/00; F01N 1/10
[58] Field of Search ........................ 181/33 K, 33 R

[56] References Cited
UNITED STATES PATENTS

| | | | |
|---|---|---|---|
| 1,910,981 | 5/1933 | Bescherer | 181/33 K |
| 3,316,990 | 5/1967 | Wilner | 181/33 K |
| 3,478,958 | 11/1969 | Hinch | 181/33 K |
| 3,700,068 | 10/1972 | Francis | 181/33 K |
| 3,860,085 | 1/1975 | Gilbert | 181/33 K |

Primary Examiner—L. T. Hix
Assistant Examiner—Vit N. Miska
Attorney, Agent, or Firm—Charles Hieken; Jerry Cohen

[57] ABSTRACT

A sound reducing enclosure for a vibratory feeder includes a cylindrical base assembly which may be in one piece, or alternatively in two halves for ease of installation and maintenance of the equipment within the enclosure. The cylindrical base assembly rests upon a base plate comprising two flat half circles of ¼ inch aluminum with the space between at right angles to the split between the cylinder halves and bounding a square hole for mounting clearance of vibratory feeder bowl equipment. A transparent generally hemispherical dome assembly of ¼ inch plexiglass is hingedly secured to the top of the cylinder base assembly for trapping sound within the enclosure while allowing observation of the machine operations. A generally conical-shaped member covered with acoustical foam is suspended from the top of the dome with its apex downward and may be hollow to function as a parts filling funnel with the top hole in the dome being covered by two layers of lead-loaded vinyl and/or other appropriate materials slotted so as to allow parts to flow through while attenuating sound. Alternatively, the top assembly may be flat.

10 Claims, 6 Drawing Figures

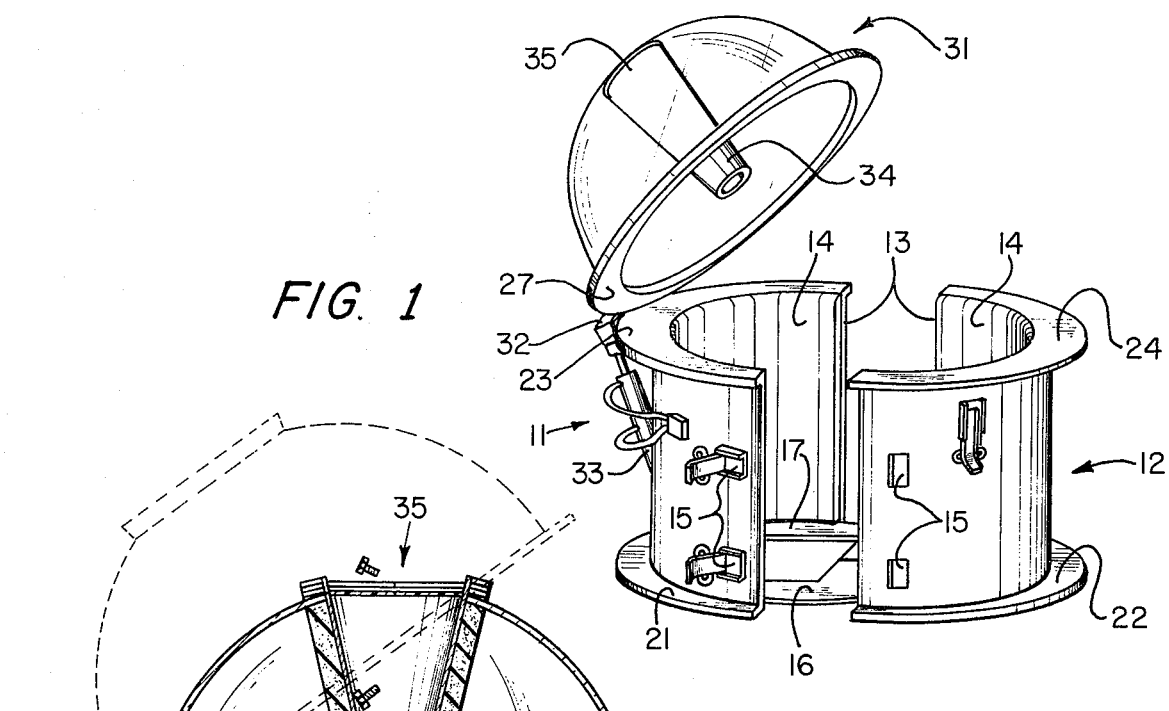
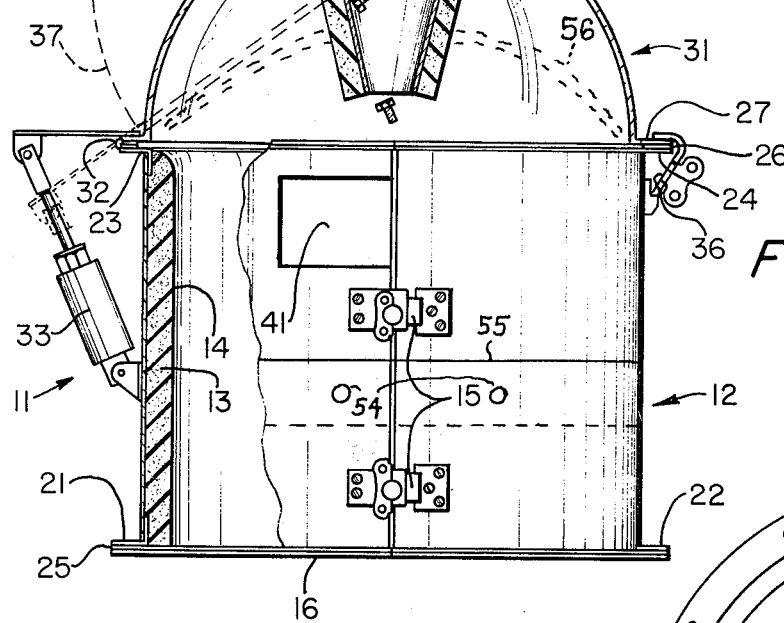
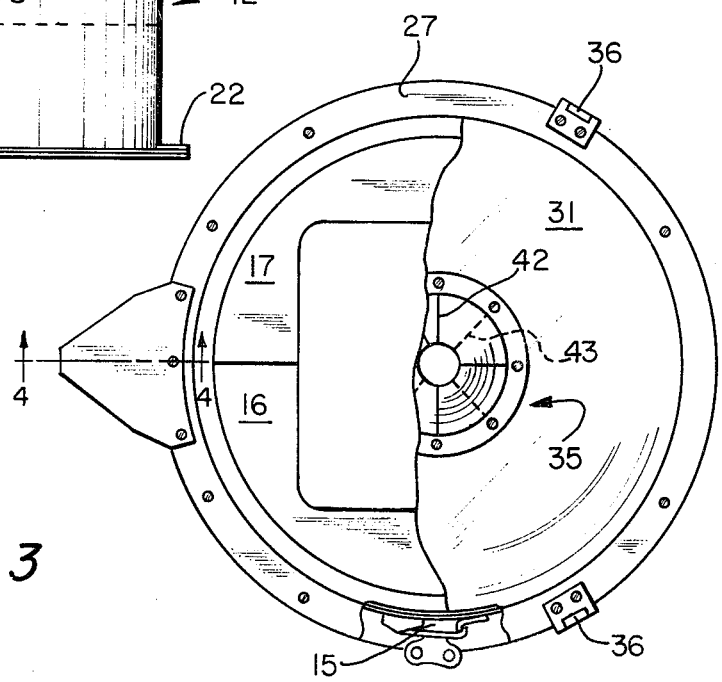

SOUND REDUCING ENCLOSING

BACKGROUND OF THE INVENTION

The present invention relates in general to noise reduction and more particularly concerns novel apparatus and techniques for enclosing a nosiy machine to improve the noise environment while allowing workers to observe operation of the machine. The invention not only reduces sound but is also useful in helping keep parts clean and improving the lighting of the machine while being relatively inexpensive to fabricate. The invention also provides relatively easy and quick access to the machine enclosed.

The specific embodiment of the invention is especially useful in connection with vibratory feeder bowls. Of the estimated at least 500,000 vibratory feeder bowls in use in the United States, more than half produce noise in excess of 90dB$_A$ for 8 hours in the mode in which they are used, exceeding OSHA acceptable limits. One prior art approach for reducing the noise was to use plastic linings which wore out or different metals on the bowls. Nevertheless, the parts still impact against each other to produce excess noise. Still another source of noise is the magnetic vibrating mechanism under the bowl.

It is an important object of this invention to reduce the noise environment around machines.

It is a further object of the invention to achieve the preceding object while allowing relatively easy access to the machine during operation or assembly.

It is a further object of the invention to achieve one or more of the preceding objects while facilitating observation of the machine operation by the worker.

It is still another object of the invention to achieve one or more of the preceding objects in a manner that admits parts to the machine.

It is a further object of the invention to achieve one or more of the preceding objects with apparatus that is relatively easy and inexpensive to manufacture, install and remove when access to the machine is desired.

It is another object of the invention to achieve one or more of the preceding objects in connection with vibratory feeder bowls.

SUMMARY OF THE INVENTION

According to the invention, there is means defining a hollow cylindrical enclosure lined with acoustical energy absorbing material for enclosing a machine and resting upon a base plate. Cover means having transparent portions for observing an enclosed machine coact with the cylindrical means to form a sound energy absorbing enclosure for the machine.

Preferably the cover means is hingedly secured to the cylindrical means and preferably comprises a generally hemispherical dome of transparent material, such as plexiglass, that reflects sound to sound energy absorbing means suspended from the top of the cover means, preferably of generally conical shape with the vertex downward and hollow for functioning as a filling funnel. The opening at the top is preferably covered by sound attenuating means openable for admitting parts into the funnel while attenuating noise, such as lead-loaded vinyl materials slotted to allow parts to enter.

According to a preferred form of the invention, the cylindrical means comprises a number of elements longitudinally separated and detachably secured together by means, such as quick acting clamps.

Numerous other features, objects and advantages of the invention will become apparent from the following specification when read in connection with the accompanying drawing in which:

BRIEF DESCRIPTION OF THE DRAWING

FIG. 1 is a perspective view of an embodiment of the invention showing a number of the elements separated to better illustrate the invention;

FIG. 2 is a side view of an embodiment of the invention partially in section;

FIG. 3 is a top view of the invention with half the dome removed to better illustrate the square opening in the base plate for accommodating a machine;

DETAILED DESCRIPTION OF PREFERRED EMBODIMENTS

Figure 4:
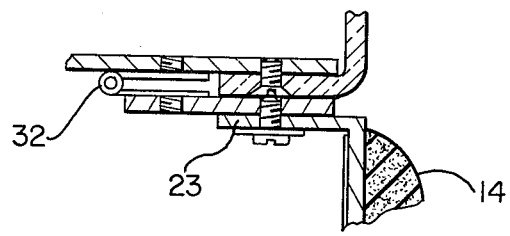
FIG. 4 is a sectional view through section 4—4 of FIG. 3 illustrating a detail of the hinge construction.

With reference now to the drawing and more particularly FIG. 1 thereof, there is shown an exemplary embodiment of the invention especially useful for enclosing vibratory feeder bowls to appreciably reduce the noise environment while admitting parts to the enclosed machine and allowing an operator to observe it. The enclosure comprises semicylindrical base elements 11 and 12 each lined with one to two-inch thick select UL94 acoustical foam 13 having a 0.001 inch aluminized mylar covering 14 laminated to it to protect the foam from dust, dirt and oil while transmitting the sound energy to the foam for absorption. The mylar covering 14 also helps to prevent a potentially hazardous fire situation from occurring by preventing the foam from acting as a sponge in an oil-laden air environment. The aluminized mylar covering 14 also functions to reflect light within the enclosure to further enhance visibility. Quick acting clamps 15, two of which are visible in FIG. 1, clamp the semicylindrical elements 11 and 12 together to form the cylindrical base means that is bolted to the semicircular base plates 16 and 17 formed with a square opening for accommodating the vibratory feeder machine. Semicircular plates 16 and 17 are separated along a diameter that is substantially at right angles to the diameter between semicylindrical elements 11 and 12.

Semicylindrical elements 11 and 12 are formed with bottom flanges 21 and 22, respectively, and top flanges 23 and 24, respectively, for engagement with an acoustical sealing gasket, such as lower gasket 25 and upper gasket 26 (FIG. 2).

A flange 27 of generally hemispherical plexiglass dome 31 engages upper gasket 26 when the dome is closed. Dome 31 is hingedly attached to semicylindrical element 11 by a hinge 32 and may be raised or lowered by operation of a pneumatically operated piston 33.

Plexiglass dome 31 carries a depending sound absorbing member 34 of generally hollow conical shape with the apex of the cone downward and the cone height preferably of the order of the radius of hemispherical dome 31. Sound energy absorbing member 34 typically is a hollow plymetal cone covered with acoustical foam 1 inch thick having a 0.001 inch aluminized mylar covering laminated to it. A flexible cover 35 over the opening of the base of the inverted cone at the top of dome 31, typically comprising two layers of lead-loaded vinyl and other selected materials such as urethane sheet and silicone rubber, which are slotted so as to allow different size and weight parts to enter unimpeded, yet be mostly closed to prevent noise from inside the enclosure from escaping through the top opening. The two layers of material may be mounted with the layers facing or opposing each other, thereby giving increased or decreased closure pressure, depending upon the weight of the parts. The plymetal cone 34 itself acts to damp the impact of the falling parts to further decrease noise. By rotating the layers of material so that the slits in one layer are displaced about 15° from the slits in the other, there is no clear opening from the inside of the enclosure to the outside through a slit.

Referring to FIG. 2, there is shown a front view of the embodiment of FIG. 1 assembled with a portion at the left and top cut away to illustrate certain structural details. The same reference numerals identify corresponding elements throughout the drawing. FIG. 2 shows the quick access link lock 36 (rotated through 60° from its actual position shown in FIG. 3) that keeps dome 31 clamped against gasket 26 to provide a good seal against the escape of sound energy. Broken lines 37 generally indicate the open position of dome 31 when the plane embracing flange 27 is at an angle of substantially 70° with the horizontal. FIG. 2 also shows a parts exit opening 41 that is normally cut at the installation to allow parts properly oriented for entering an injecting machine to exit from the enclosure.

Referring to FIG. 3, there is shown a top view of the invention with a portion cut away to better illustrate the square opening in the base and a portion of the flange cut away to better illustrate the quick action clamp lock 15. FIG. 3 also shows how the slots such as 42 in the upper layer of cover 35 are staggered from the slots such as 43 in the lower layer of cover 35.

Referring to FIG. 4, there is shown a sectional view through section 4—4 of FIG. 3 illustrating a detail of the hinge connection.

Figure 5:
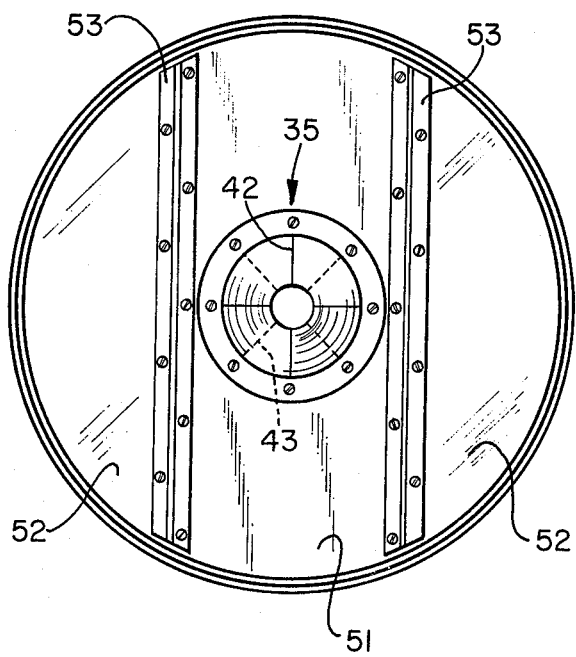
FIG. 5 is a top view of an embodiment of the invention having a doubly-hinged flat cover.

Referring to FIG. 5, there is shown an alternate flat-top cover comprising a centered strip of ¼ inch aluminum plate 51 having a D-shaped section of ¼ inch plexiglass or lexan such as 52 on each edge both of which are hinged with a continuous vinyl hinge such as 53. Aluminum plate 51 may also contain cover 35, is bolted to flange 23 and carries on its underside 1 to 2-inch acoustical foam with aluminized mylar. In the flat top models, the plexiglass portions are preferably held to the flange 23 by a quick acting clamp 36.

Figure 6:
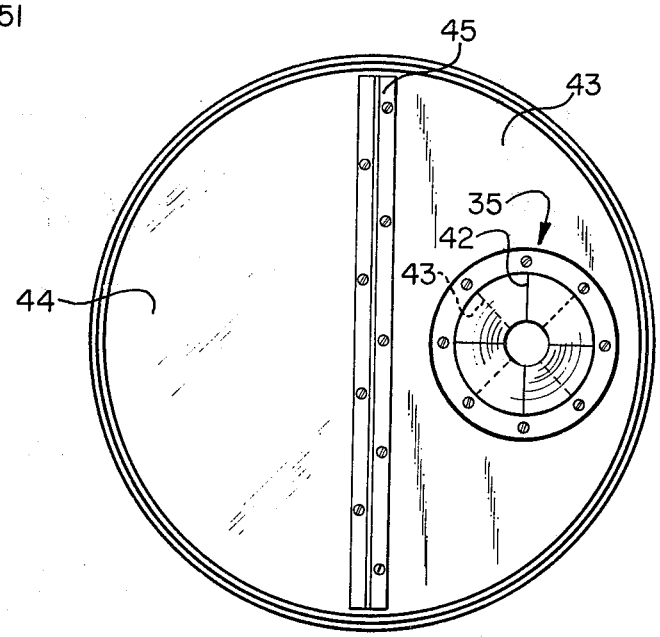
FIG. 6 is a top view of a singly hinged flat cover embodiment of the invention.

Referring to FIG. 6, there is shown a partial top view of an alternate covering arrangement according to the invention. This cover plate comprises an aluminum semicircular plate 43 that is bolted to the upper flange 23 and a semicircular plexiglass plate 44 secured to the aluminum plate 43 by a flexible vinyl strip hinge 45. Aluminum plate 43 may contain cover 35 as shown, and the depending sound absorbing energy member comprises 1 to 2-inch thick acoustical foam with aluminized mylar cover.

The metal material used in the invention is preferably plymetal a constrained layer damped steel laminate commercially available. An advantage of using magnetic material is that when a hole is cut in the cylinder assembly for access, such as parts exit 41, the opening may be covered with a limp PVC material having a magnetic backing as an economical alternative to a tight fitting access door. The high density of the material is sufficient to block noise from exiting through the hole. Clear vinyl with a magnetic strip around its periphery may also be used to close an accessible opening while allowing visibility to view jamming of parts at this critical location.

A second plexiglass 56 dome can be added 4 inches approximately apart from the first for superior noise reduction results.

A split 55 in the vertical plane of the cylinders will allow adjustment of height for different feeder bowls secured by thumbscrews 54.

FIG. 4 shows the flange outside the cylindrical body. It is within the principles of the invention to arrange flanges 24 and 27 so that they are inside the cylindrical body and thereby provide a good acoustical seal within restricted areas.

There has been described novel apparatus and techniques resulting in providing a quiet work area, full vision of the machine operation, clean parts, improved lighting, low maintenance, protection of the sound absorbing material from oil and dust with apparatus that is relatively easy and quick to install and remove by relatively unskilled personnel and at modest cost. An actual commercial embodiment of the invention commercially available from Ecology Controls Inc. in Waltham, Massachusetts, achieves an insertion loss of 20 db or greater over the frequency range from 125 to 16,000 kHz according to actual measurements. (Approximately 25 $dB_A$)

It is evident that those skilled in the art may now make numerous other uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Sound reducing enclosing apparatus comprising,
   cylindrical means internally lined with sound absorbing material for surrounding a machine and absorbing noise therefrom,
   base means for supporting said cylindrical means and formed with an opening for accommodating a machine to be enclosed,
   and cover means securable to said cylindrical means for coacting with the latter and said base means for enclosing a machine internally thereof and reducing the sound transmitted outside said enclosure while providing visible access to the enclosed machine,
   said cover means comprising transparent solid material and having depending sound absorbing means for absorbing sound energy produced by an enclosed machine.

2. Sound energy reducing enclosing apparatus in accordance with claim 1 wherein said cover means is formed with an opening having cover means for admitting parts to the inside of said enclosure while attenuating the transmission of sound energy therethrough.

3. Sound reducing enclosing apparatus in accordance with claim 1 wherein said cover means comprises a generally hemispherical member of solid transparent material having a depending generally cone-shaped element of sound absorbing material.

4. Sound energy absorbing enclosing apparatus in accordance with claim 1 wherein said cover means comprises a flat plate having a depending layer of sound energy absorbing material.

5. Sound reducing enclosing apparatus in accordance with claim 1 wherein said cylindrical means comprises semicylindrical elements with means for detachably securing said semicylindrical elements together, and said base means comprises first and second generally semicircular elements adjacent along a diameter substantially orthogonal to a diameter embraced by the plane between said semicylindrical elements, whereby said enclosing apparatus may be installed around a vibratory feeder without removing the feeder bowl.

6. Sound energy reducing enclosing apparatus in accordance with claim 2 wherein said cover means comprises at least one layer of dense flexible material formed with radial slits defining flaps therebetween whereby the weight of entering parts causes the flaps between slits to deflect downward and admit the part through said opening.

7. Sound energy reducing enclosing apparatus in accordance with claim 6 and further comprising at least another of said layers formed with radial slits, the slits in the first of said layers being angularly displaced from the slits in the second of said layers so that there is no clear opening through the slits between the inside and the outside of said enclosure.

8. Sound reducing enclosing apparatus in accordance with claim 3 wherein said generally cone-shaped element is hollow having its base opening at the top of said hemispherical member and its apex opening below at a location where sound reflected from the inside of said dome impinges upon said cone, where said cone also comprises means for admitting parts to the interior of said enclosing apparatus.

9. Sound reducing enclosing apparatus in accordance with claim 8 and further comprising flexible sound attenuating covering means over said base opening for normally closing said opening and responsive to the weight of parts for selectively uncovering said opening to allow parts to pass through said element into said interior.

10. Sound reducing enclosing apparatus in accordance with claim 9 wherein said covering means comprises two adjacent sheets of sound attenuating flexible material each formed with slits with the slits in one sheet displaced from those in the other.

* * * * *